(12) United States Patent
Narayanaswami et al.

(10) Patent No.: US 7,685,375 B2
(45) Date of Patent: Mar. 23, 2010

(54) PROTECTING CONFIDENTIAL INFORMATION ON PORTABLE STORAGE MEDIA

(75) Inventors: Chandrasekhar Narayanaswami, Wilton, CT (US); Mandayam Thondanur Raghunath, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 11/447,394

(22) Filed: Jun. 6, 2006

(65) Prior Publication Data

US 2007/0283094 A1    Dec. 6, 2007

(51) Int. Cl.
*G06F 12/14* (2006.01)
(52) U.S. Cl. ...................... 711/152; 711/153
(58) Field of Classification Search ............ None
See application file for complete search history.

(56) References Cited

U.S. PATENT DOCUMENTS

| | | | | |
|---|---|---|---|---|
| 2,944,246 A | * | 7/1960 | Dicke | 365/152 |
| 6,365,851 B1 | * | 4/2002 | Gasper | 200/43.14 |
| 6,681,304 B1 | * | 1/2004 | Vogt et al. | 711/164 |
| 2002/0188855 A1 | * | 12/2002 | Nakayama et al. | 713/186 |
| 2004/0165314 A1 | * | 8/2004 | Fujiwara et al. | 360/133 |
| 2004/0186746 A1 | * | 9/2004 | Angst et al. | 705/3 |
| 2005/0047219 A1 | * | 3/2005 | Perner et al. | 365/189.07 |
| 2006/0031410 A1 | * | 2/2006 | Nagata et al. | 709/219 |
| 2007/0179934 A1 | * | 8/2007 | Basov et al. | 707/3 |

* cited by examiner

*Primary Examiner*—Christian P Chace
*Assistant Examiner*—Chad L Davidson
(74) *Attorney, Agent, or Firm*—Michael J. Buchenhorner; Vazken Alexanian

(57) ABSTRACT

A portable storage system for connecting to a host, the portable storage system includes a storage device for storing information and a switch. The switch includes a get mode wherein the host sees only the free space in the storage device and not the part storing the information. Optionally, the portable storage system includes a give mode wherein the storage medium shows an empty space to the host and any file or directory is marked as shared and wherein the host sees a file-system whose size equals the amount of empty storage space on the storage device and an owner mode showing all of the stored information to the host and enabling the owner of the system to uncheck a shared flag on a storage device that received from another user that added files.

19 Claims, 3 Drawing Sheets

PROTECTING CONFIDENTIAL INFORMATION ON PORTABLE STORAGE MEDIA

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of portable storage media, and more particularly relates to the field of protecting confidential information on portable storage media such as USB storage media.

BACKGROUND OF THE INVENTION

USB flash storage devices have become a popular way of people to share files with each other. It is common for one to give their USB storage device to someone else and ask him/her to write a file into the storage device. One may also put one or more files on their USB storage device and give the storage device to someone else so that the other person can copy the file off the storage device. Storage sizes on USB storage media has been growing at a rapid pace and it is common to have USB flash storage devices that are over a giga byte. USB hard disk storage media which are a bit larger than USB flash storage devices can also be used for similar file exchange purposes and these easily are of the order of a 100 GB. Given these large capacities one may have several files on their USB storage media.

Usually when one plugs in a USB storage device into a PC the PC has full access to all of the storage on the storage device and can read or write all of it. When person A gives his storage device to person B, he/she is vulnerable to person B reading or modifying content that person A did not intend. Even if the two people exchanging the storage devices trust each other, it is possible that the machines used in the process may be infected with malicious software and may steal information without the knowledge of the parties concerned. Malicious software may also erase contents of the USB storage device.

There are finger-print enabled USB storage media that have two partitions; an open partition that is readable/writable by all and a private partition that is completely hidden until a valid fingerprint is provided. If a valid fingerprint is provided the private partition is fully accessible.

While such a storage device can be used to address some of these issues, by keeping private information in the protected partition and shared information in the open partition. However, the size of the public partition is fixed when the storage device is initialized and cannot be changed without loss of data later. Also data stored in the public partition is vulnerable. Therefore, there is a need for a method and mechanism that overcomes the aforementioned shortcomings.

SUMMARY OF THE INVENTION

A portable storage system for connecting to a host, the portable storage system includes a storage device for storing information and a switch. The switch includes a get mode wherein the host sees only the free space in the storage device and not the part storing the information. Optionally, the portable storage system includes a give mode wherein the storage medium shows an empty space plus all shared files.

DETAILED DESCRIPTION

Figure 1:
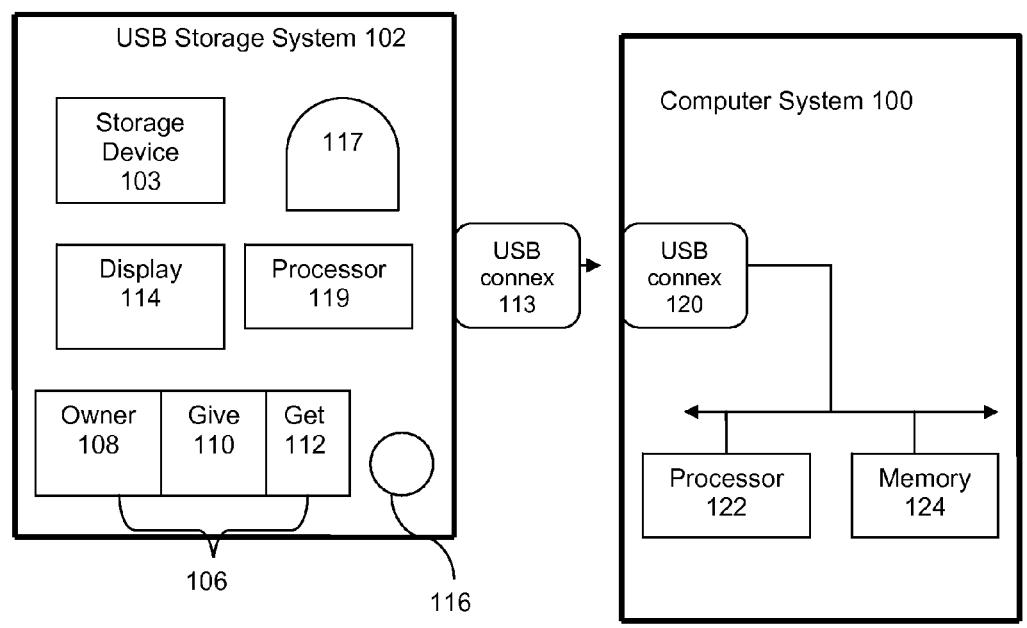
FIG. 1. is a high level block diagram showing an information processing system according to the invention

Referring to FIG. 1, there is shown a block diagram of a USB storage system 102 and a computer system 100 according to an embodiment of the invention. On the storage system 102 (e.g., a USB key or portable MP3 player) we have a switch 106 that can be in one of three positions—each corresponding to one of three modes: owner 108, give 110, and get 112. The switch 106 is preferably in a recessed position and is hard to change unless the user uses a pencil tip or other suitable means to push it. So it is easy for the owner to see if the other party who has been given the storage system 102 tries to change the switch position. Alternatively, a dial 116 can be used to .g., last one day, last two days, last 7 days, etc. moving the dial filters the list of files shown.

A display 114 can be used to display a selected data range which is used to filter the list of files shown in the give position and among other things the state of the device.

In an alternate embodiment, the recessed switch 106 can be replaced by a set of passwords. No password corresponds to the get mode. There are two distinct passwords for give and owner modes. Each file and directory on the storage system 102 has a flag associated with it that says whether the file/directory is shared. In one embodiment, to simplify usability if a directory is shared, all the files in it are shared.

In another alternative, the switch 106 can be replaced by a fingerprint reader 117. For example, when the user places his/her thumb on the fingerprint reader 117 this places the storage unit in the get state and placing the index finger in the reader 117 puts the storage unit in the give state. As in the case of passwords, this gives the user more control because others cannot change the switch from get to give or vise versa.

Depending on whether the owner wants to get or give files to other people he sets the switch 106 the appropriate position. The storage system 102 uses storage virtualization techniques to create file-systems of varying appropriate sizes that protect the contents on the storage device 103 by blocking access to parts of storage outside the boundaries of the file system are prevented. The storage device is described in detail below.

If the switch is set to the get position 112 and plugged into computer 100, the storage system 102 uses storage virtualization to only show the free space on the storage device. For example, if the. USB storage device 103 has 1 GB capacity with 300 MB free, the PC 100 to which the storage device 103 is plugged into it is fooled into thinking that the USB storage system 102 is a 300 MB capacity storage device which is preferably formatted as a VFAT (virtual file allocation table)

file system, though other file-systems can be used depending on the user's preferences. The PC 100 can insert files into the storage system 102, read them back, modify them or even erase these files. It can also create directories and directory hierarchies in the storage system 102. Assuming that the PC 100 adds files to the storage system 102 that occupy 50 MB, when the storage device 103 is unplugged from PC 100 and reinserted into another PC2 the storage device 103 now shows up on PC2 as if it were a 250 MB capacity storage device that is empty. The interruption of the power in between these steps is the signal to the USB storage system 102 that it must show up as an empty storage device 103 since the switch is in the "get" position 112. So the user can get file A from PC 1, file B from PC 2, and file C from PC 3. All the while each PC cannot see any of the other files the user got from earlier PCs or other files already on the storage device 103. Any files/directories created in the get position 112 are automatically marked with the shared flag. In other embodiments any files/directories created in the get position 112 may not be automatically marked with the shared flag. The shared flag is only relevant in the "give" 112 or "owner" 108 positions as described below.

The first time the switch 106 is set to the "give" position 112, the storage system 102 shows empty space as the only available contents. Files and directories can be created in this space. Any file/directory created in the "give" position 112 is automatically marked as shared. In the "give" position 112 only the files/directories marked "shared" are visible. When unplugged and re-plugged, the storage system 102 only shows those files that are marked shared. The PC 100 has full access to the files in the visible partition. It can read, write or erase these files. However it can make these modifications only to the files in the "give" partition 112. If the switch is then set to the "get" position 110 the storage device shows only the free space and receives files. Files received in this manner will be visible in the "give" partition since these received files are automatically marked as shared. So if the switch is then moved to "give" position 112 from the "get" position, all recently obtained files are also available for sharing, reading (or rewriting). So a user can put all public info that he wants to share into the storage device 103 by setting it in the give position 112 and inserting the files into the storage system 102. He can also get various files from other people and these can be given away to others.

In the owner position 108 all of the storage device 103 is visible to a user of PC 100 when the storage system 102 is inserted therein. Also the shared flags on files/directories are visible. The user can clear these flags either at a file level or a directory level. Clearing the shared flag on a directory recursively clears all the flags on the contents of the directory. Setting the flag on a directory only sets the flag on the directory but not its contents. Optionally there can be an operation that recursively sets the shared flag on all of its contents. Also optionally, the storage unit can include a processor, a battery, a display and user interface controls to view the directory and file structure on the storage device 103 and to change the flags for the directories and files without the need to attach the storage unit to a PC. These additional features provide extra flexibility but add cost to the system.

The storage device can also include a write-protect switch. If this is also set along with the switch in the give position the data in the file-system visible to the host PC is also write protected. The storage system 102 can include a USB connector 113 and the storage 103 can be Flash memory. Alternatively, the storage 103 can be a disk drive, flash, or molecular storage.

Figure 2:
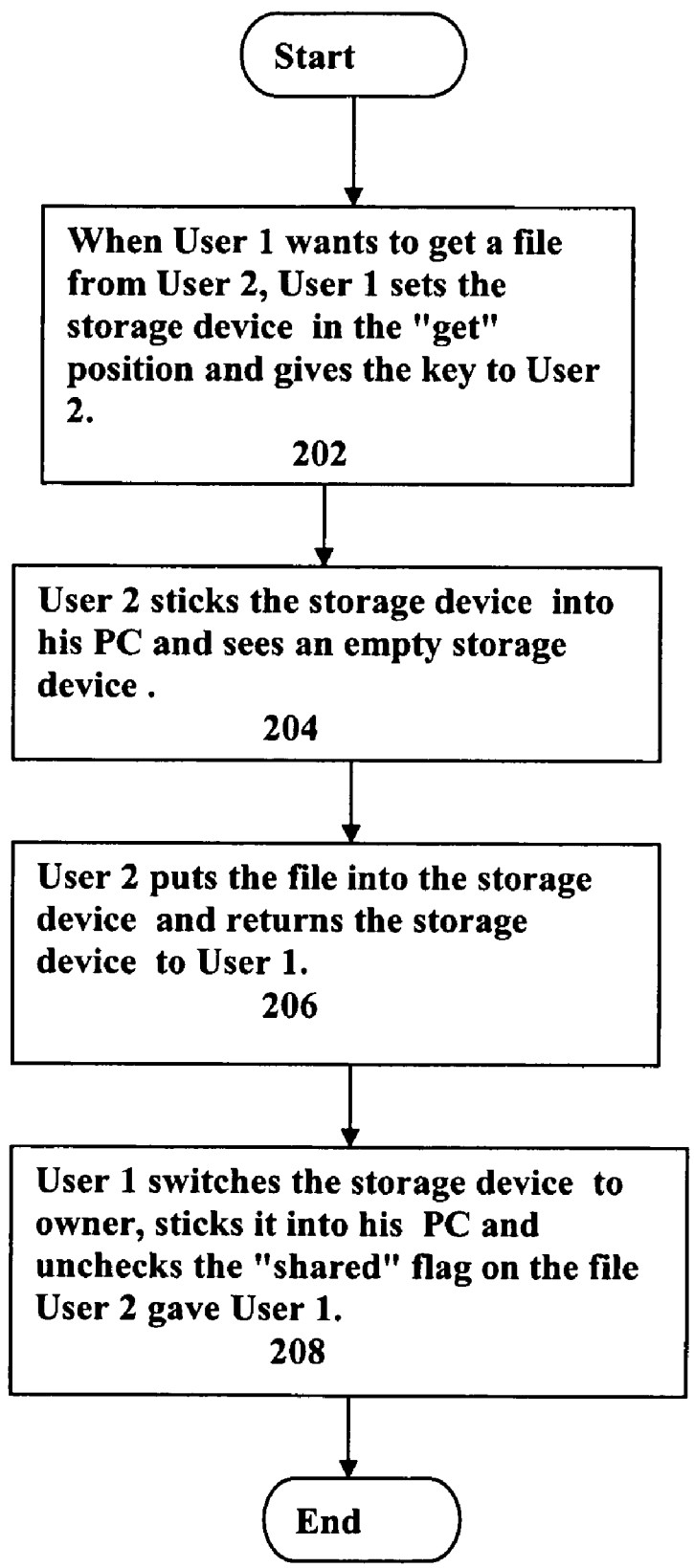
FIG. 2 is a flowchart illustrating a method according to an embodiment of the invention.

Referring to FIG. 2, there is shown a flow chart illustrating an information processing method 200 usage model. When user 1 wants to get a file from User 2, user 1 in step 202 he sets the storage device 103 in the "get" position 112 and gives the storage device 103 to User 2. in step 204 User 2 attaches the storage system 102 to his PC 100 and sees an empty storage device 103. In step 206 User 2 puts the file into the storage system 102 and returns the storage system 102 to User 1. In step 208 User 1 switches the storage system 102 to owner 108, attaches it to his PC 100 and optionally unchecks the "shared" flag on the file User 2 gave him.

Figure 3:
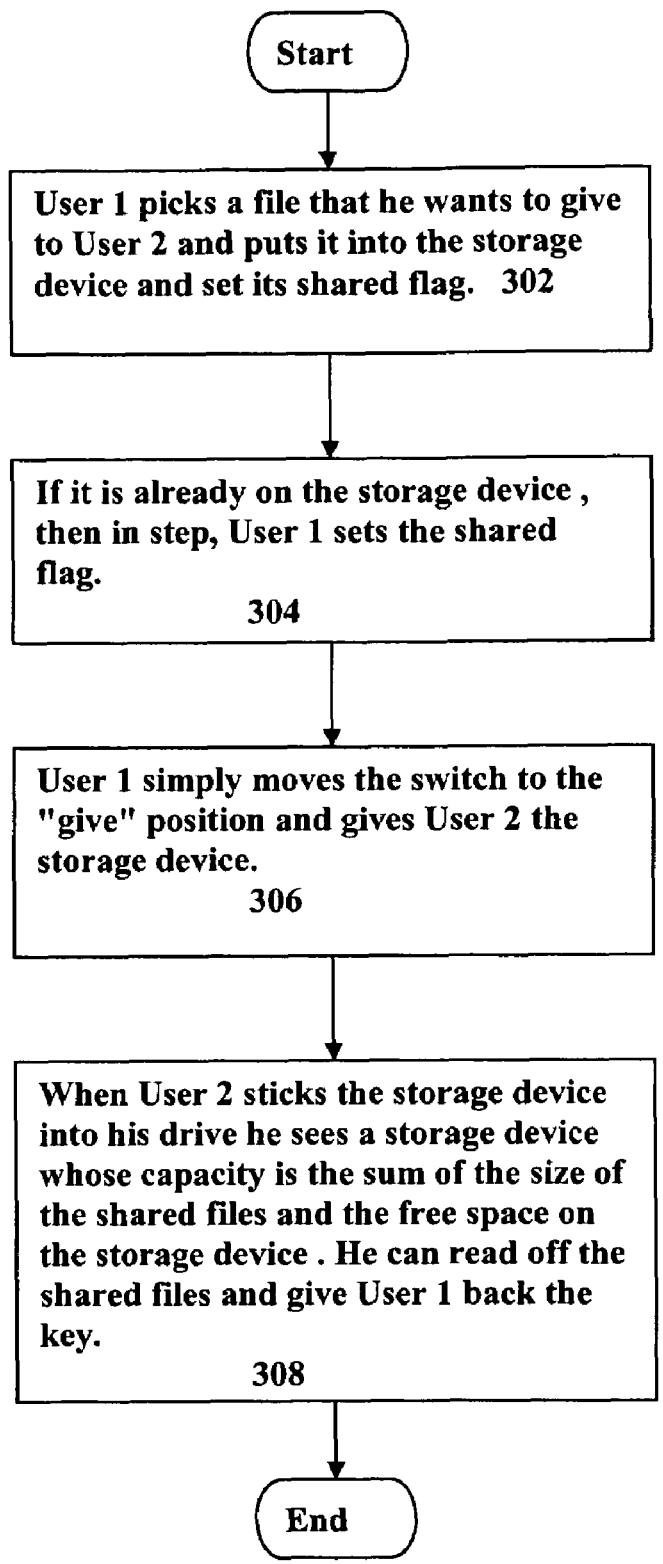
FIG. 3 is a flowchart illustrating a method according to another embodiment of the invention.

Referring to FIG. 3, there is a flow chart illustrating the usage when User 1 wants to give User 2 a file in the USB storage system 102. In step 302 User 1 stores the file he wants to give to User 2 and puts it into the storage system 102 and sets its shared flag. If it is already on the storage device 103, then in step 304, User 1 sets the shared flag. In step 306, User 1 simply moves the switch 106 to the "give" position 110 and gives User 2 the storage system 102. In step 308 when User 2 attaches the storage device 103 to his PC 120 he sees a storage system 102 whose capacity is the sum of the size of the shared files and the free space on the storage device 103. He can read/access the shared files and give User 1 back the storage system 102.

In order to further facilitate simplicity of use an additional input mechanism such as dial on the storage unit can specify a date range that is used to select from the list of shared files that are visible in the partition when the switch is put to the give position. In this manner, the user can indicate that only files marked as shared in the last 3 days should be visible in the visible partition. The date range could be indicated on the unit itself or through an interface on a PC.

Therefore, while there has been described what is presently considered to be the preferred embodiment, it will understood by those skilled in the art that other modifications can be made within the spirit of the invention.

We claim:

1. A portable storage system for connecting with a host information processing system, the portable storage system comprising:

a storage device for storing information, said information comprising files and directories wherein each file and directory has a flag associated with it that indicates whether it is shared, and wherein the storage device comprises:

a visible partition comprising those files and directories that are visible to a user of the host information processing system when the storage device is connected therewith;

a non-visible partition comprising those files and directories that are not visible to the user of the host information processing system when the storage device is connected therewith, such that access to the files and directories in the non-visible partition is blocked;

wherein the host information processing system, when connected with the storage device, perceives a file system whose size equals a sum of an amount of empty storage space and a combined size of the files and directories marked as shared on the portable storage system;

a processor;

a switch operatively coupled with the storage device and configured to be set in a plurality of modes, wherein the plurality of modes comprise:

an owner mode wherein all of the files and directories are in the visible partition, wherein the owner mode, when selected, shows a shared flag indicating that the files marked with the flag are shared between the storage system and the host system and further comprising an apparatus for an owner of the portable storage system to modify a shared flag and to add files to the visible partition by checking the shared flags;

a give mode wherein any file and directory created in said give mode is automatically marked as shared and only the files and directories marked as shared are in the visible partition; and a get mode wherein no files or directories are in the visible partition and the storage device shows only free space in the storage device to the user of the host information processing system when the storage device is connected therewith, and wherein in the get mode a size of the storage device presented to the user of the host information processing system equals an amount of the free space on the storage device;

a write-protect switch wherein if the write-protect switch is set along with the switch in the give mode the files in the visible partition are write-protected;

a dial that allows the user to specify a date range for filtering the list of files shown in the give position to show only those files marked as shared within the specified date range; and a display that shows the selected date range and a state of the device.

2. The system of claim 1, where the storage device comprises one selected from a group consisting of: a USB interface, a disk drive, flash memory, and molecular storage.

3. The system of claim 1 wherein the switch is recessed so that a user's finger cannot get into the recess without a tool.

4. The system of claim 1 wherein the switch is operable using a fingerprint reader.

5. The system of claim 4 wherein when the user places a first finger on the fingerprint reader for placing the storage unit in the get state and when the user places a second finger on the fingerprint reader that puts the storage unit in the give state and when the user places a third finger on the fingerprint reader that puts the storage unit in the owner state.

6. The system of claim 1 further comprising a dial for selecting a date range to additionally filter the list of files marked shared that are in the visible partition.

7. The system of claim 1 further comprising the host information processing system comprising an interface for connecting the portable storage system to the host information processing system.

8. A method for a first user getting a file from a second user in a portable storage device comprising a get mode, a give mode, and an owner mode of operation, the method comprising:

receiving the portable storage device set in the get mode of operation on the portable storage device,
wherein the storage device stores information comprising files and directories,
wherein each file and directory has a flag associated with it that indicates whether it is shared, and
wherein the storage device further comprises:
a visible partition comprising those files and directories that are visible to a user of the host information processing system when the storage device is connected therewith; and
a non-visible partition comprising those files and directories that are not visible to the first user of the host information processing system when the storage device is connected therewith, such that access to the files and directories in the non-visible partition is blocked;

wherein setting the get mode comprises:
using storage virtualization to obscure any files and directories in the portable storage device; and
setting a capacity of the storage device equal to a free space of the portable storage device;
wherein the host information processing system, when connected with the storage device, perceives a file system whose size equals a sum of an amount of empty storage space and a combined size of the files and directories marked as shared on the portable storage system;

receiving the portable storage device for coupling with a computing device from the second user, wherein the portable storage device comprises at least one file stored by the second user, and a shared flag associated with the at least one file;

setting the portable storage device to the owner mode, wherein setting the portable storage device to the owner mode comprises:
using virtualization to show all of the files and directories in the visible partition;
showing a shared flag indicating that the at least one file marked with the shared flag is shared between the storage system and the computing device; and
allowing the first user of the portable storage device to modify the shared flag and to add files to the visible partition by checking the shared flags;

coupling the portable storage device with computing device; and un-checking the shared flag associated with the at least one file;

setting the give mode such that any file and directory created in the give mode is automatically marked as shared and only the files and directories marked as shared are in the visible partition, setting the give mode comprising:
setting a write-protect switch such that the files in the visible partition are write-protected;
setting a dial that allows the user to specify a date range for filtering the list of files shown in the give position to show only those files marked as shared within the specified date range, wherein the selected date range and a state of the device is presented on a display.

9. The method of claim 8 wherein in the get mode, an interruption of power in between the giving and receiving steps prompts the portable storage device to re-set the capacity of the portable storage device equal to the free space of the portable storage device such that the portable storage device appears to be empty.

10. The method of claim 9 wherein setting the portable storage device to the owner, give, and get modes is done by setting a switch.

11. The method of claim 9 wherein setting the portable storage device to the owner and give modes is done by entering a valid password.

12. The method of claim 9 wherein setting the get mode comprises the first user placing a first finger on a fingerprint reader;
setting the give mode comprises the first user placing a second finger on the fingerprint reader; and
setting the owner mode comprises the first user placing a third finger on the fingerprint reader.

13. A method for a first user giving a file to a second user in a portable storage device having a get mode, a give mode, and an owner mode of operation, comprising steps of:
storing in the portable storage device the at least one file said first user wants to give to the second user;
wherein the portable storage device comprises:

a visible partition comprising those files and directories that are visible; and a non-visible partition comprising those files and directories that are not visible, such that access to the files and directories in said non-visible partition is blocked;

setting a shared flag on the at least one file;

setting the portable storage device to the give mode, wherein setting the portable storage device to the give mode comprises:

using storage virtualization to show only the files and directories marked as shared in the visible partition; and setting a capacity of the portable storage device equal to a sum of a size of the shared files and the free space on the portable storage device;

setting a dial on the portable storage device to a specific date range for filtering the list of files shown in the give position to show only those files marked as shared within the specified date range;

giving the portable storage device to the second user for coupling to a computer system;

receiving the portable storage device from the second user.

14. The method of claim 13 further comprising setting a write-protect switch, wherein if the write-protect switch is set along with the switch in the give mode the data in the file-system visible to the host system is write protected.

15. The method of claim 13 wherein setting the give mode comprises setting a password to obscure any files and directories in a non-visible partition of the portable storage device.

16. The method of claim 13 further comprising setting a display on the portable storage device to display a selected data range to filter a list of files available.

17. The method of claim 16 further comprising displaying a state of the portable storage device.

18. The method of claim 13 further comprising setting a dial on the portable storage device to a date range such that moving the dial filters the list of files shown by date.

19. The method of claim 13 wherein setting the get mode comprises the first user placing a first finger on a fingerprint reader;

setting the give mode comprises the first user placing a second finger on the fingerprint reader; and setting the owner mode comprises the first user placing a third finder on the fingerprint reader.

* * * * *